United States Patent [19]

Sailor

[11] Patent Number: 4,541,537
[45] Date of Patent: Sep. 17, 1985

[54] FLUID TIGHT SEAL FOR CONTAINER

[75] Inventor: Clifford L. Sailor, Altadena, Calif.

[73] Assignee: City of Hope National Medical Center, Duarte, Calif.

[21] Appl. No.: 553,556

[22] Filed: Nov. 21, 1983

[51] Int. Cl.[4] .................... F16L 17/00; B65D 45/30
[52] U.S. Cl. .................................. 215/274; 215/309; 220/378; 285/137 R; 285/177; 285/342; 285/353; 285/346
[58] Field of Search ............... 285/353, 342, 343, 341, 285/178, 137 R, DIG. 12, 345, 346, 384, 382.7, DIG. 2; 220/237, 238, 319, 378; 215/329, 309, 217, 243, 272, 273, 274

[56] References Cited

U.S. PATENT DOCUMENTS

| 3,103,373 | 9/1963 | Lennon et al. | 285/342 |
| 3,437,357 | 4/1969 | Rubin | 285/342 |
| 4,253,583 | 3/1981 | Lynch | 215/274 X |

FOREIGN PATENT DOCUMENTS

| 2098690 | 11/1982 | United Kingdom | 285/353 |
| 2108227 | 5/1983 | United Kingdom | 285/353 |

OTHER PUBLICATIONS

Catalog C578, Crawford Fitting Co., Title Page and pp. 2 and 19.

Primary Examiner—Dave W. Arola
Attorney, Agent, or Firm—K. H. Boswell; Edward D. O'Brian

[57] ABSTRACT

A seal for a container having a straight cylindrical neck with an opening in the neck includes an upper sealing member which fits over the top of the neck and down a portion of the cylindrical surface of the neck. The top sealing member has a tapered edge on its bottom which accepts an indentically tapered edge of an intermediate sealing member which engages it. The intermediate sealing member also has a further tapered edge which accepts a tapered edge of a bottom sealing member which mates with it. A lower locking member goes around the cylindrical neck of the bottle and is shaped such that a portion of it is spaced away from the cylindrical neck of the bottle to form a cavity in which fits the intermediate and lower sealing members. A top locking member goes over the top sealing member and both a skirt on the top sealing member and the top locking member also fit within the cavity of the lower locking member. Threads between the upper and lower locking member hold the structure together.

20 Claims, 3 Drawing Figures

U.S. Patent  Sep. 17, 1985  4,541,537
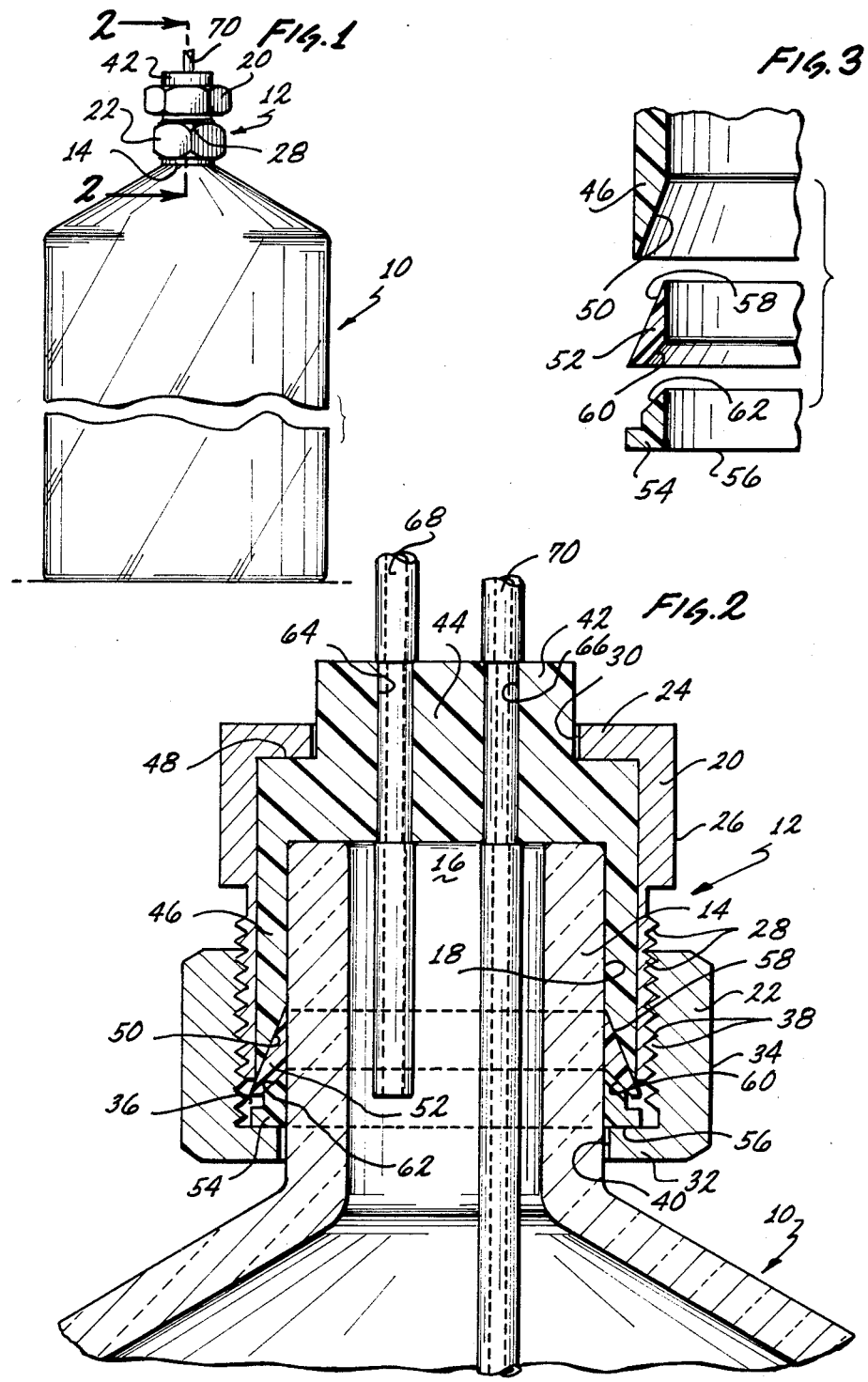

FLUID TIGHT SEAL FOR CONTAINER

BACKGROUND OF THE INVENTION

This invention is directed to a seal or cap which is capable of forming a fluid tight seal against the top of a cylindrical neck of a container or bottle. The seal includes a plurality of sealing members having acute surfaces which engage one another to form the fluid tight seal.

In vessels or containers utilized in research and/or medical applications, it is often times necessary to form fluid tight seals on the top of these containers, with the seals formed of materials which are essentially resistant to corrosive and/or hard to contain materials or materials which can maintain sterility conditions. The old "cork in the bottle" type seal is very inefficient against any pressure build up within the interior of the bottle or container and must be formed of a fairly deformable material such as rubber or cork. These materials are not very resistant against chemicals or the like and as such simply are not suitable.

Screw caps, while being resistant to being blown off of the bottle or container by pressure within the container, require that the container also be threaded. Further, if the caps are made of chemically resistant plastics, they are subject to stress along the joining portion of the top part of the cap with the threaded flange portion when the cap is screwed excessively tight on to the container. Often times when so tightly stressed, the caps will break, with the top part of the cap separating from the threaded portion.

Metal "swagelok" caps are also known; however, the metallic materials from which these are made are not suitable for containing certain fluids which are incompatible with these metallic materials.

The fluorocarbon material known under the trademark Teflon TM is essentially inert with respect to most chemical reagents, fluids or gasses. Further, it is highly resistant to "wetting" by liquids and gasses such that these liquids and gasses are resistant to movement across the Teflon TM material by capillary action. Because of its low chemical reactivity in combination with its plastic or deformable properties, Teflon TM is very "slippery" with respect to other materials. For this reason, corks or plugs of Teflon TM material tend not to stick in the openings or mouths of bottles, vessels or other containers. Because of its plasticity or deformability, threads on caps or the like made of Teflon TM are easily stripped and as such, are not useful in situations where adequate seals must be maintained within pressure bottles, reagent bottles or the like.

BRIEF DESCRIPTION OF THE INVENTION

In view of the above, it is evident that there exists a need for new and approved seals for the use in combination with containers having cylindrical necks. It is therefore a broad object of this invention to provide such a seal. It is a further object of this invention to provide a seal which is resistant to numerous chemical and medical reagents yet is capable of forming a fluid tight seal with a container which is adapted to contain such reagents. It is an additional object of this invention to provide a seal which is easily and quickly attached to a container having a cylindrical neck and is further easily and conveniently disattached from this container when it is desirous to use the container for a different purpose.

These and other objects, as will be evident from the remainder of this specification, are achieved in combination with a container having a cylindrical neck with an opening in the top of the neck, a seal which comprises: top seal means, said top seal means sized and shaped so as to fit over the top of said cylindrical neck to close said opening and further to extend down and around a portion of said cylindrical neck and terminating in a sealing edge; intermediate seal means sized and shaped so as to fit around said cylindrical neck below said top seal means, said intermediate seal means having an upper sealing edge and a lower sealing edge, said upper sealing edge of said intermediate seal means mating with said sealing edge of said top seal means; bottom seal means sized and shaped so as to fit around said cylindrical neck below said intermediate seal means, said bottom seal means having an upper sealing edge, said upper sealing edge of said bottom seal means mating with said lower sealing edge of said intermediate seal means; bottom locking means fitting around said cylindrical neck and having at least a portion thereof spaced from said cylindrical neck so as to form a cavity between said bottom locking means and said cylindrical neck, at least said bottom and said intermediate seal means positionable in said cavity, said bottom locking means including engagement means for engaging said said bottom seal means and holding said bottom seal means with respect to said bottom locking member, said bottom locking means further including joining means; top locking means sized and shaped so as to fit around said top seal means and extend into said cavity, said top locking means including engagement means for engaging said top seal means and holding said top seal means with respect to said top locking means, said top locking means further including joining means for joining said top locking member to said bottom locking member.

In the preferred embodiment of the invention, the top seal means would comprise a top seal member having a cap portion and a skirt portion with the lowermost terminus edge of the skirt portion formed as a concave truncated surface of revolution, such as a frustoconical surface. Further, the intermediate seal means would comprise an intermediate sealing ring having an upper edge which is formed as a convex surface of revolution which mates with the concave surface on the top sealing member. The bottom edge of the intermediate sealing ring would be formed as a concave surface of revolution, preferrably a frustoconical shape. The bottom seal means would preferredly be formed as a bottom sealing ring with an upper edge formed as a concave surface of revolution mimicking the convex surface of revolution of the bottom edge of the intermediate sealing ring.

When so formed, the intermediate sealing ring would be engaged by both the bottom sealing ring and the upper sealing member and when pressure was applied to these two members, the concave and convex edges on the upper sealing member and the intermediate and lower sealing rings would slide on one another to tend to plastically deform the intermediate sealing ring toward the cylindrical neck of the container so as to form a fluid tight seal with it.

In the preferred embodiment, the angle of the surface of revolution of the concave sealing edge of the upper sealing member with the cylindrical wall of the neck of the container would be a smaller angle than the angle made by the concave surface of revolution of the lower edge of the intermediate sealing ring also with this cylindrical wall.

BRIEF DESCRIPTION OF THE DRAWINGS

This invention will be better understood when taken in conjunction with the drawing wherein:

FIG. 1 shows a container or bottle having the seal of this invention attached to the top thereof;

FIG. 2 is a side elevational view in section about the line 2—2 of FIG. 1;

FIG. 3 is an exploded fragmentary view of certain of the components seen in FIG. 2.

This invention utilizes certain principles and/or concepts as are set forth in the claims appended to this specification. Those skilled in the arts to which this invention pertains will realize that these principles an/or concepts are capable of being utilized in a variety of embodiments differing from the exact embodiment utilized for illustrative purposes herein. For this reason, this invention is not to be construed as being solely limited to the illustrative embodiment but is to be construed as being limited only by the claims appended hereto.

DETAILED DESCRIPTION OF THE INVENTION

Referring now to the drawings, in FIG. 1 there is shown a container 10 having a seal generally depicted by the numeral 12 attached thereto. As is evident from viewing FIG. 2, the container 10 has a neck area 14 which is formed as a cylindrical surface of revolution. The neck 14 includes an opening 16 allowing ingress and egress into the interior of the container 10.

The container 10 is of the type wherein the outside surface 18 of the neck 14 is a smooth cylinder without the usual threads or the like sometimes found on other containers. In view of this, other types of caps or the like cannot be utilized to seal the container 10.

The seal 12, when seen from the outside as in FIG. 1, has an upper locking member 20 which engages with a lower locking member 22. The upper locking member 20 has a flange portion 24 which is integrally formed with a skirt portion 26. The skirt 26 includes external threads 28 located thereon. An opening 30 is formed in the center of the flange 24.

The lower locking member 22 includes a flange 32 formed on its lowermost periphery which is integrally formed with a cylindrical wall 34. The wall 34 is sized and shaped so as to be larger in diameter than the diameter of the neck 14 of the container 10. As such, a cavity 36 is formed between the wall 34 and the neck 14 of the container 10. The inside surface of the wall 34 contains threads 38 which mate with the threads 28 on the upper locking member 20. An opening 40 within the flange 32 allows for sliding of the lower locking member 22 down over the neck 14.

An upper sealing member 42 has a cap portion 44 and a skirt portion 46 integrally formed together. The cap portion 44 fits over the opening 16 in the neck 14 of the container 10. The skirt portion 46 fits down along the sides of the cylindrical neck 14 of the container 10. A portion of the cap 44 is sized such that it extends through the opening 30 of the upper locking member 20 with the flange 24 of the upper locking member 20 fitting down on to a shoulder 48 formed in the cap portion 44 of the upper sealing member 42. The lowermost periphery of the skirt 46 of the upper sealing member 42 is cut at an angle to form a sealing edge 50.

An intermediate sealing ring 52 fits below the upper sealing member 42 and extends around the neck 14 of the container 10. Directly below the intermediate sealing ring 52 is a bottom sealing ring 54. Both the intermediate sealing ring 52 and the bottom sealing ring 54 fit over the neck 14 of the container 10. The bottom edge 56 of the bottom sealing ring 54 rests on the flange 32 of the lower locking member 22.

Referring now to FIG. 3, it can be seen that the sealing edge 50 on the skirt 46 of the upper sealing member 42 is formed as a concave truncated conical surface of revolution i.e., it extends radialy outwardly and axially downwardly from the remainder of te member 42. When the upper sealing member 42 is placed on the neck 14 of the container 10, the sealing edge 50 thus makes an acute angle with the outside surface 18 of the neck 14.

Again referring to FIG. 3, it can be seen that the intermediate sealing ring 52 has an upper edge 58 and a lower edge 60. The upper edge 58 which extends radially inwardly and axially upwardly towards the member 42 is shaped as a convex truncated conical surface of revolution mimicking that of the sealing edge 50 of the upper sealing edge 42. When the intermediate sealing ring 52 is abutted against the upper sealing member 42, the edges 50 and 58 respectively make a tight seal with one another.

Further in FIG. 3, it can be seen that the lower edge 60 of the intermediate sealing ring 52 is also formed as a concave truncated conical surface of revolution. The angle with which the lower edge 60 makes with respect to the outside surface 18 of the neck 14, however, is a greater acute angle than is the angle which the sealing edge 50 makes with the outside surface 18.

The bottom sealing ring 54 includes an upper edge 62 which is also formed as a convex truncated conical surface of revolution mimicking the shape of the lower edge 60 of the intermediate sealing ring 52. As such, the upper edge 62 of the bottom ring 54 mates with the lower edge 60 of the intermediate sealing ring 52.

To assemble the seal 12 on to the neck 14 of the container 10, first the lower locking member 22 is placed around the neck 14, followed by the bottom sealing ring 54 and then the intermediate sealing ring 52. Next the upper sealing member 42 is placed over the neck 14, followed by the upper locking member 20. When the upper locking member 20 is threaded into the lower locking member 22, the skirt portion 46 of the upper sealing member 42 and the intermediate sealing ring 52 and bottom sealing ring 54 are squeezed together as the flanges 24 and 32 on the upper and lower locking members 20 and 22 move toward one another. This causes the intermediate sealing ring 52 to slide along the acute surfaces between it and the upper sealing member 42 and the bottom sealing ring 54. The sliding movement of the intermediate sealing ring 52 is inwardly toward the neck 14 such that a fluid tight seal is formed between it and the neck 14.

Preferredly, the upper sealing member 42, the intermediate sealing ring 52 and the bottom sealing ring 54 are all made of Teflon TM, a fluorocarbon material. Because of the "plasticity" or cold flow of this material, the upper sealing member 42, intermediate sealing ring 52 and bottom sealing ring 54 all are capable of a certain degree of flow such that they can tightly grip the outside surface 18 of the neck 14 of the container 10.

The upper sealing member 42 can include bores 64 and 66 located therein, allowing for passages of tubes 68 and 70 into the interior of the container 10 through the seal 12. This provides for ingress and egress to the interior of the container 10.

In the preferred embodiment of the invention, the skirt 46 of the upper sealing member 42 is sized and shaped such that it extends downwardly the same distance as does the skirt 26 of the upper sealing member 20. The intermediate sealing ring 52 is of a slightly larger diameter at its largest diameter than is the diameter of the skirt 46 of the upper sealing member 42. This then wedges the intermediate sealing ring 52 in against the sealing edge 50 of the upper sealing member 42 and since the skirt 46 of the member 42 is fixedly held against outward radial displacement by the skirt 26 of the upper sealing member 20, upward movement of the intermediate sealing ring 52 thus pushes it inwardly against the outside surface 18 of the neck 14 of the container 10. Further, upward movement of the lower sealing ring 54 does the same thing against the lower edge 60 of the intermediate sealing ring 52 to also wedge the lower sealing ring 54 against the outside surface 18 of the neck 14 of the container 10.

In the preferred embodiment of te invention the angle of surfaces 50 and 58 is about 20° with respect to the outside surface 18 of the neck 14 and the angle of surfaces 60 and 62 is about 45° with respect to surface 18.

I claim:

1. In combination with a container having a cylindrical neck with an opening in the top of the neck, a seal which comprises:

top seal means, said top seal means sized and shaped so as to fit over the top of said cylindrical neck to close said opening and further to extend down and around a portion of said cylindrical neck and terminating in a sealing edge;

intermediate seal means sized and shaped so as to fit around said cylindrical neck below said top seal means, said intermediate seal means having an upper sealing edge and a lower sealing edge, said upper sealing edge of said intermediate seal means mating with said sealing edge of said top seal means;

bottom seal means sized and shaped so as to fit around said cylindrical neck below said intermediate seal means, said bottom seal means having an upper sealing edge, said upper sealing edge of said bottom seal means mating with said lower sealing edge of said intermediate seal means;

bottom locking means fitting around said cylindrical neck and having at least a portion thereof spaced from said cylindrical neck so as to form a cavity between said bottom locking means and said cylindrical neck, at least said bottom and said intermediate seal means locatable in said cavity, said bottom locking means including engagement means for engaging said said bottom seal means and holding said bottom seal means with respect to said bottom locking member, said bottom locking means further including joining means;

top locking means sized and shaped so as to fit around said top seal means and having a portion thereof extending into said cavity, said top locking means including engagement means for engaging said top seal means and holding said top seal means with respect to said top locking means, said top locking means further including joining means for joining said top locking member to said bottom locking member.

2. The seal of claim 1 wherein:
said sealing edge of said top seal means and said lower sealing edge of said intermediate seal means are each shaped as concave truncated conical surfaces and said upper sealing edge of said intermediate seal means and said upper sealing edge of said bottom seal means each are shaped as convex truncated conical surfaces.

3. The seal of claim 2 wherein:
said sealing edge of said top seal means and said upper sealing surface of said intermediate seal means both make a first acute angle with respect to said cylindrical neck and said lower sealing edge of said intermediate seal means and said upper sealing edge of said bottom seal means both make a second acute angle with respect to said cylindrical neck.

4. The seal of claim 3 wherein:
said first acute angle is smaller than said second acute angle.

5. The seal of claim 1 wherein:
said top locking means includes top flange means, said top flange means fitting over said top seal means so as to engage said top seal means and bias said top seal means toward said opening in top of said neck when said top and bottom locking means are locked to one another.

6. The seal of claim 5 wherein:
said bottom locking means includes bottom flange means fitting under said bottom seal means to engage said bottom seal means and bias said bottom seal means towards said intermediate seal means when said top and bottom locking means are locked to one another.

7. The seal of claim 6 wherein:
said sealing edge of said top seal means and said lower sealing edge of said intermediate seal means are each shaped as concave truncated conical surfaces and said upper sealing edge of said intermediate seal means and said upper sealing edge of said bottom seal means each are shaped as convex truncated conical surfaces.

8. The seal of claim 7 wherein:
said sealing edge of said top seal means and said upper sealing surface of said intermediate seal means both make a first acute angle with respect to said cylindrical neck and said lower sealing edge of said intermediate seal means and said upper sealing edge of said bottom seal means both make a second acute angle with respect to said cylindrical neck.

9. The seal of claim 8 wherein:
said first acute angle is smaller than said second acute angle.

10. The seal of claim 9 wherein:
said joining means on each of said top and bottom locking means comprises thread means threadably connecting said top and said bottom locking means.

11. The seal of claim 10 wherein:
said top seal means includes at least one opening passing through said top seal means so as to provide ingress and egress into the interior of said container when said seal is located on said container.

12. The seal of claim 10 wherein:
said thread means on said bottom locking means comprises a concave set of threads located within said cavity and said thread means on said top locking means comprises a convex set of threads located on said portion of said top locking means which extends into said cavity.

13. The seal of claim 9 wherein:
top seal means, said intermediate seal means and said bottom seal means each are formed of a material capable of plastic movement under pressure.

14. The seal of claim 13 wherein:
said material is a fluorocarbon material.

15. The seal of claim 1 wherein:
top seal means, said intermediate seal means and said bottom seal means each are formed of a material capable of plastic movement under pressure.

16. The seal of claim 15 wherein:
said material is a fluorocarbon material.

17. In combination with a vessel having a cylindrical neck with an opening in the top of said neck, a seal which comprises:
a top sealing member, said top sealing member having a cap portion and a skirt portion integrally formed together, said cap portion sized and shaped to fit over said top of said neck covering said opening, said skirt portion sized and shaped to fit around of said cylindrical neck and extend part way down said cylindrical neck toward said vessel, said skirt terminating in a circumferentially extending skirt edge, said skirt edge tapering radially outwardly and axially downwardly away from said cap so as to form an acute angle with said cylindrical neck;
an intermediate sealing ring sized and shaped so as to fit around said neck below said top sealing member, said intermediate sealing ring having circumferentially extending upper and lower edges, said upper edge tapering radially inwardly and axially upwardly toward said top sealing member so as to be matable with said skirt edge, said lower edge tapering radially outwardly and axially downwardly away from said top sealing member so as to form an acute angle with said cylindrical neck;
a bottom sealing ring sized and shaped to fit around said cylindrical neck below said intermediate sealing ring, said bottom sealing ring having a circumferentially extending upper edge tapering radially inwardly and axially upwardly towards said intermediate sealing ring so as to be matable with said lower edge of said intermediate sealing ring, said bottom sealing ring further having a circumferentially extending bottom edge;
a top locking member sized and shaped to fit around at least a portion of said top sealing member, said top locking member including a skirt portion circumferentially extending around the outside of said skirt portion of said top sealing member, said top locking member including locking means located around said skirt portion of said top locking member;
a bottom locking member sized and shaped so as to fit around said cylindrical neck and including a portion thereof sized and shaped so as to be spaced away from said cylindrical neck to form a cavity between said portion and said cylindrical neck, said cavity sized and shaped so as to contain said intermediate and said bottom sealing rings and at least a portion of the skirt portion of said top sealing member and said top locking member, said bottom locking member including locking means capable of engaging with and locking with said locking means on said top locking member.

18. The seal of claim 17 wherein:
said bottom locking member includes bottom flange means capable of engaging said bottom edge of said bottom sealing ring;
said top locking means includes top flange means capable of engaging said portion of said top sealing member which fits over said top of said neck;
said locking means on said top and said bottom locking member each comprises thread means such that said top and said bottom locking member threadably engage each other to hold said top and said bottom locking members together.

19. The seal of claim 17 wherein:
said acute angle formed between said skirt edge and said cylindrical neck is less than said acute angle formed between said bottom edge of said intermediate sealing member and said cylindrical neck.

20. The seal of claim 19 wherein:
said top sealing member, said intermediate sealing ring and said bottom sealing ring each are formed of a material capable of plastic movement under pressure;
said bottom locking member includes bottom flange means capable of engaging said bottom edge of said bottom sealing ring;
said top locking means includes top flange means capable of engaging said portion of said top sealing member which fits over said top of said neck;
said locking means on said top and said bottom locking member each comprises thread means such that said top and said bottom locking member threadably engage each other to hold said top and said bottom locking members together.

* * * * *

UNITED STATES PATENT AND TRADEMARK OFFICE
CERTIFICATE OF CORRECTION

PATENT NO. : 4,541,537

DATED : September 17, 1985

INVENTOR(S) : Clifford L. Sailor

It is certified that error appears in the above-identified patent and that said Letters Patent is hereby corrected as shown below:

```
In the Abstract, line 6, "indentically" should be
                       --identically--.
Column 2, line 52, "concave"should be --convex--.
Column 2, line 53, "convex" should be --concave--.
Column 3, line 18, "an/or" should be --and/or--.
Column 4, line 15, "te" should be --the--.
Column 4, line 14, "radialy" should be --radially--.
Column 4, line 26, "edge 42" should be --member 42--.
Column 5, line  9, "sealing" should be --locking--.
Column 5, line 17, "sealing" should be --locking--.
Column 5, line 25, "te" should be --the--.
Column 5, line 58, eliminate the second word "said".

Column 7, line 23, eliminate the word "of".
```

Signed and Sealed this

Eighth Day of April 1986

[SEAL]

Attest:

DONALD J. QUIGG

Attesting Officer

Commissioner of Patents and Trademarks